(12) United States Patent
Xu et al.

(10) Patent No.: US 11,695,299 B2
(45) Date of Patent: Jul. 4, 2023

(54) QUICK-RESPONSE VOLTAGE CONTROL METHOD OF DISTRIBUTION SYSTEM CONSIDERING MULTIPLE PARTICIPANTS

(71) Applicants: TIANJIN UNIVERSITY, Tianjin (CN); ELECTRIC POWER RESEARCH INSTITUTE OF CHINA SOUTHERN POWER GRID, Guangdong (CN)

(72) Inventors: Tao Xu, Tianjin (CN); Xiaoxue Wang, Tianjin (CN); He Meng, Tianjin (CN); Han Yang, Tianjin (CN); Peng Li, Tianjin (CN); Xiaobin Guo, Tianjin (CN); Li Yu, Tianjin (CN); Quan Xu, Tianjin (CN); Liqi Liu, Tianjin (CN)

(73) Assignees: TIANJIN UNIVERSITY, Tianjin (CN); ELECTRIC POWER RESEARCH INSTITUTE OF CHINA SOUTHERN POWER GRID, Guangzhou (CN)

( * ) Notice: Subject to any disclaimer, the term of this patent is extended or adjusted under 35 U.S.C. 154(b) by 255 days.

(21) Appl. No.: 17/061,505

(22) Filed: Oct. 1, 2020

(65) Prior Publication Data
US 2022/0109326 A1 Apr. 7, 2022

(51) Int. Cl.
*H02J 13/00* (2006.01)
*G06F 17/11* (2006.01)
*G06Q 50/06* (2012.01)

(52) U.S. Cl.
CPC ........ *H02J 13/00032* (2020.01); *G06F 17/11* (2013.01); *G06Q 50/06* (2013.01)

(58) Field of Classification Search
CPC ................................ G06F 17/11; G05Q 50/06
USPC ......................................................... 700/286
See application file for complete search history.

(56) References Cited

U.S. PATENT DOCUMENTS

| | | | | |
|---|---|---|---|---|
| 5,594,659 A | * | 1/1997 | Schlueter | H02J 3/24 307/29 |
| 8,239,070 B1 | * | 8/2012 | Schlueter | H02J 3/0012 702/182 |
| 9,537,314 B2 | * | 1/2017 | Inuzuka | H02J 3/00 |
| 2015/0094968 A1 | * | 4/2015 | Jia | G05B 15/02 702/60 |
| 2015/0288181 A1 | * | 10/2015 | Mokhtari | G06Q 50/06 700/291 |
| 2019/0108600 A1 | * | 4/2019 | Kong | G06Q 40/04 |

(Continued)

*Primary Examiner* — Md Azad

(57) ABSTRACT

The present invention relates to a quick-response voltage control method of distribution systems considering multiple participants, comprising a multiple agent system (MAS), which collects the local information of the distribution system controlled by each agent and interacts with the local information collected by each agent, so that voltage-power sensitivity of the distribution system, used for providing the theoretical basis for voltage regulation, is calculated by distributed calculation; and multiple participants, which establish incentive mechanism by DSOs based on the bidding game with imperfect information, and independently decide their own strategies to obtain the voltage regulation subsidy from the DSOs, according to the calculated voltage-power sensitivities, thus provide voltage support for the distribution system in the process of pursuing benefit maximization.

3 Claims, 5 Drawing Sheets

(56) References Cited

U.S. PATENT DOCUMENTS

2019/0148977 A1* 5/2019 Kuroda ............ H02J 13/00006
                                                    700/286
2019/0296548 A1* 9/2019 Patel ........................ H02J 3/00

* cited by examiner

QUICK-RESPONSE VOLTAGE CONTROL METHOD OF DISTRIBUTION SYSTEM CONSIDERING MULTIPLE PARTICIPANTS

TECHNICAL FIELD

The present invention relates to the quick-response voltage control of distribution system, and in particular to a quick-response voltage control method of distribution system considering multiple participants.

BACKGROUND OF THE PRESENT INVENTION

In recent years, the permeability of distributed generation (hereinafter referred to as DG) in the distribution networks (DNs) has greatly increased. With the uncertainty and volatility of some renewable energy sources (e.g. wind power and photovoltaic power), the distribution system operators (DSOs) are expecting to face significant challenges to the control and operation of DNs. Among these challenges, voltage variations have been the most significant issues.

The existing voltage control strategy of an active distribution network is designed to mitigate the impacts of massive DG units on the voltage profile by switching capacitors, utilizing the on-load tap changers (hereinafter referred to as OLTCs), controlling interconnection switches, etc. Florin C et al. proposed that DSOs use centralized methods to control the capacitors, OLTC and interconnection switches coordinately, so as to maximize DG's active power access. Georgios C K et al. proposed a weakly centralized distributed voltage control method based on the optimal allocation of reactive power to solve the problem of excessive voltage caused by a large number of photovoltaic access. However, for the future active power DNs with multiple uncertainties and multiple participants, it will not be able to solve the problem of voltage fluctuations and renewable energy consumption in the distribution system if only relying on the traditional centralized voltage control method.

As one of the important forms for distributed energy to be incorporated into the DNs, microgrid (MG) is a small autonomous distribution and utilization system which is composed of DG units, loads, energy storage systems and monitoring systems. MG has advantages of autonomous operation, optimized management and coordinated control, etc. Therefore, it has great potential in the auxiliary operation control of future active power distribution systems. Due to MGs can optimize management and coordinate control, DSOs can motivate the MGs in the distribution system to actively participate in voltage control, so that the waste of wind and solar power can be avoided while ensuring that the voltage of the distribution system is in a safe range. At present, there are few researches on the application of multi-microgrids in distribution system and the existing applications of multi-microgrids are mainly focused on economic operation and energy management. The research of MGs providing ancillary services in DNs is rare. Chengshan Wang et al. proposed a two-layer optimization model of distribution system energy management including multi-microgrids. Zhaoyu Wang et al. proposed that DSOs unifies the day-ahead optimization of multi-microgrids to realize the economic operation of distribution systems. However, the paper does not consider the situation of multi-microgrids belonging to different operators.

SUMMARY OF THE PRESENT INVENTION

To overcome the deficiencies of the prior art, the present invention provides a quick-response voltage control method of distribution systems considering multiple participants which can reduce the communication of control system and improve the reliability and real-time performance of the control system.

For this purpose, the following technical solutions are employed in the present invention. A quick-response voltage control method of distribution systems considering multiple participants, comprising a multiple agent system (MAS), which collects the local information of the distribution system controlled by each agent and interacts with the local information collected by each agent, so that voltage-power sensitivity of the distribution system, used for providing the theoretical basis for voltage regulation, is calculated by distributed calculation; and multiple participants, which establish incentive mechanism by DSOs based on the bidding game with imperfect information, and independently decide their own strategies to obtain the voltage regulation subsidy from the DSOs, according to the calculated voltage-power sensitivities, thus provide voltage support for the distribution system in the process of pursuing benefit maximization.

Specifically, the quick-response voltage control method includes the following steps:
1) collect local information of the distribution system by each agent;
2) calculate the voltage-power sensitivities of the radial DN by MAS;
3) establish the incentive mechanism by the DSO;
4) establish strategies by the participants (MGs) based on bidding games with imperfect information.

Wherein, the "local information" described in Step 1) includes:

Voltage $V_n$ of Node n, injected active power $P_n$ and injected reactive power $Q_n$ of Node n, active power $P_{to,n}$ and reactive power $Q_{to,n}$ of Node n flow from the upstream branch, and the branch resistances $R_n$ and reactance $X_n$ between Node n−1 and Node n.

The voltage-power sensitivities of the radial DN by MAS described in Step 2 is the voltage-power sensitivity between any two Nodes n and m in the radial DN, which is denoted by $$\frac{\partial V_m}{\partial P_n},$$

wherein $V_m$ denotes the voltage at Node m, $P_n$ denotes the injected active power of Node n. The calculation method of the voltage-power sensitivity $$\frac{\partial V_m}{\partial P_n}$$

is divided into the following three cases according to the relative topological positions of Nodes n and m:

a) When Node n is on the upstream of Node m, the calculation formula is as follows:

$$\frac{\partial V_m}{\partial P_n} = \frac{\partial V_n}{\partial P_n} \cdot \frac{\partial V_m}{\partial V_n} = \frac{\partial V_n}{\partial P_n} \cdot \prod_{i=n+1}^{m} \frac{\partial V_i}{\partial V_{i-1}} \tag{1}$$

wherein, $V_n$ denotes the voltage of Node n, $V_i$ denotes the voltage of Node i, $V_{n-1}$ denotes the voltage of Node n−1, $$\frac{\partial V_i}{\partial V_{i-1}}$$

denotes the influence degree of unit change of $V_{i-1}$ caused by the change of the injected power of Node i−1 and its upstream Node on $V_i$.

b) When Node m is in the upstream of Node n, the calculation formula is as follows:

$$\frac{\partial V_m}{\partial P_n} \approx \frac{\partial V_m}{\partial P_m} \cdot \frac{\partial P_{to,m}}{\partial P_{to,n}} = \frac{\partial V_m}{\partial P_m} \cdot \prod_{i=m+1}^{n} \frac{\partial P_{to,i-1}}{\partial P_{to,i}} \quad (2)$$

wherein, $P_{to,n}$ denotes the active power flowing into Node n from the upstream branch, $P_{to,m}$ denotes the active power flowing into Node m from the upstream branch, $P_{to,i}$ denotes the active power flowing into Node i from the upstream branch, $P_{to,i-1}$ denotes the active power flowing into Node i−1 from the upstream branch, $$\frac{\partial P_{to,i-1}}{\partial P_{to,i}}$$

denotes the influence degree of unit power change of $P_{to,i}$ caused by Node n or its downstream Nodes on $P_{to,i-1}$.

c) When Node n and Node m are on different branches, Node e is the common node of two branches of Node n and Node m, the calculation formula is as follows.

$$\frac{\partial V_m}{\partial P_n} = \left(\frac{\partial V_e}{\partial P_n} \bigg/ \frac{\partial V_e}{\partial P_e}\right) \cdot \frac{\partial V_m}{\partial P_e} \quad (3)$$

Wherein, $V_e$ denotes the voltage of Node e, $P_e$ denotes the injected active power of node e, $$\frac{\partial V_m}{\partial P_e}$$

and $$\frac{\partial V_e}{\partial P_n}$$

are obtained by formula (1) and formula (2), respectively.

In the above three calculation cases, for any Node n, the calculation formulas are as follows.

$$\frac{\partial V_n}{\partial V_{n-1}} = \frac{V_n^2}{V_n^2 - (R_n P_{to,n} + X_n Q_{to,n})} \quad (4)$$

$$\begin{cases} \dfrac{\partial V_1}{\partial P_1} = -\dfrac{R_1}{V_1} \\ \dfrac{\partial V_n}{\partial P_n} = -\sum_{i=1}^{n}\left[\dfrac{R_i}{V_i} \cdot \left(\prod_{j=i+1}^{N} \dfrac{\partial P_{to,j-1}}{\partial P_{to,j}}\right) \cdot \dfrac{\partial P_{to,n}}{\partial P_n}\right] \approx -\sum_{i=1}^{n}\left(\dfrac{R_i}{V_i} \cdot \prod_{j=i+1}^{n} \dfrac{\partial P_{to,j-1}}{\partial P_{to,j}}\right), n > 1 \end{cases} \quad (5)$$

$$\frac{\partial P_{to,n-1}}{\partial P_{to,n}} = \frac{V_n^3 + 2P_{to,n} R_n V_n - 2R_n(P_{to,n}^2 + Q_{to,n}^2) \cdot \dfrac{\partial V_n}{\partial P_n}}{V_n^3} \quad (6)$$

Wherein, $V_1$ denotes the voltage of Node 1, $R_1$ and $X_1$ denote the branch resistance and reactance between Node 0 and Node 1 respectively, and $P_1$ denotes the injected active power of Node 1. $P_{to,j}$ denotes the active power flowing into Node j from the upstream branch; $P_{to,j-1}$ denotes the active power flowing into Node j−1 from the upstream branch; $R_i$ and $X_1$ denote the branch resistance and reactance between Node i−1 and Node i respectively; $R_n$ and $X_n$ denote the branch resistance and reactance between Node n−1 and Node n, respectively;

The derivations of $$\frac{\partial P_{to,n-1}}{\partial P_{to,n}}$$

and $$\frac{\partial V_n}{\partial P_n}$$

cannot be obtained directly and the iteration process is required. At the first iteration, the increment of line losses is negligible, i.e.

$$\frac{\partial P_{to,i}}{\partial P_{to,i+1}} \approx 1,$$

$\forall i=1, 2, \ldots, n$. Under the assumption, the approximation of $$\frac{\partial V_n}{\partial P_n}, \left(\frac{\partial V_n}{\partial P_n}\right)^*$$

can be expressed as follows:

$$\left(\frac{\partial V_n}{\partial P_n}\right)^* = -\sum_{i=1}^{n}\left(\frac{R_i}{V_i} \cdot \prod_{j=i+1}^{n} \frac{\partial P_{to,j-1}}{\partial P_{to,j}}\right) \approx -\sum_{i=1}^{n} \frac{R_i}{V_i} \quad (7)$$

The second iteration using the result of the first iteration, i.e., put formula (7) into formula (6), at this point, $$\frac{\partial P_{to,n-1}}{\partial P_{to,n}}$$

can be expressed as follows:

$$\frac{\partial P_{to,n-1}}{\partial P_{to,n}} = \frac{V_n^3 + 2P_{to,n}R_nV_n + 2R_n(P_{to,n}^2 + Q_{to,n}^2) \cdot \sum_{i=1}^{n}\frac{R_i}{V_i}}{V_n^3} \quad (8)$$

Then put formula (8) into formula (7) to obtain the voltage-power sensitivity $$\frac{\partial V_n}{\partial P_n}$$

with approximate accuracy.

Step 3) includes:

The reward given by the DSO is determined by the cost of voltage before and after the voltage control, the reward $\pi_{DSO}$ is calculated as follows:

$$\pi_{DSO} = CV(v_{before}) - CV(v_{after}) \quad (9)$$

$$CV(V) = \frac{1}{n} \cdot \sum_{i=1}^{n}\left(\frac{1-V_n}{\Delta V_{err}}\right)^\alpha \quad (10)$$

Wherein, $V_{before}$ and $V_{after}$ denote voltage vectors before and after voltage regulation respectively; $V=\{V_i | i \in [1,n]\}$. $\Delta V_{err}$ is the maximum allowable voltage deviation; the adjustable variable $\alpha$ is even number. The reward $\pi_{DSO}$ is only related to the voltage vector before and after voltage regulation, and is irrelevant to the numbers and strategies of MG agents. Therefore, the proposed method applies Shapley value to distribute the reward $\pi_{DSO}$. The profit function of MGi can be formulated as:

$$R_{MGi}(\Delta P_{MGi}) = \pi_{MGi}(\Delta P_{MGi}) - C_{MGi}(\Delta P_{MGi}) \quad (11)$$

Wherein, $\Delta P_{MGi}$ denotes the strategy of the i-th MG agent (MGi Agent) in the voltage regulation process, i.e., the power regulation of MGi; $\pi_{MGi}(\Delta P_{MGi})$ and $C_{MGi}(\Delta P_{MGi})$ denote the reward and cost of MGi in the voltage regulation process respectively.

Step 4) includes:

For MGi, when a voltage excursion occurs, the MAS obtains the voltage-power sensitivity required in the current-voltage regulation process, and sends the voltage-power sensitivity, the nodes with voltage violation and their voltage magnitudes to the MG Agents at all MGs participating in the current-voltage regulation. Then, all agents of the MG carry out game bidding: firstly, the i-th MG agent determines the current cost function, and according to the voltage-power sensitivity, the nodes with voltage violation and their voltage magnitudes to maximize its interests, the objective function is:

$$\text{Max}\{\pi_{MGi}(\Delta P_{MGi}) - C_{MGi}(\Delta P_{MGi})\} \quad (12)$$

Wherein, $\pi_{MGi}(\Delta P_{MGi})$ and $C_{MGi}(\Delta P_{MGi})$ denote the reward and cost of MGi in the voltage regulation process, respectively.

The MGi agent makes a decision $\Delta P_{MGi}$, and reports it to all agents of MG; then according to the strategies of other MG agents, the MGi agent updates its own strategy using the relaxation algorithm and makes the decision and reports it to all agents of MG again. All the MG Agents repeat the process of game bidding of the i-th MG agent until all the MG agents no longer change their strategies.=( ) Therefore, the distribution system runs at the Nash equilibrium point $\Delta P_{MG}^* = (\Delta P_{MG1}^*, \Delta P_{MG2}^*, \ldots, \Delta P_{MGn}^*)$ of this game bidding, for MGi, the calculation formulas are as follows.

$$\Delta P_{MGi}^* = \arg\max_{\Delta P_{MGi}} R_{MGi}(\Delta P_{MG1}^*, \Delta P_{MG2}^*, \ldots, \Delta P_{MGi}, \ldots, \Delta P_{MGn}^*) \quad (13)$$

Wherein, $R_{MGi}(\Delta P_{MG1}^*, \Delta P_{MG2}^*, \ldots, \Delta P_{MGi}, \ldots, \Delta P_{MGn}^*)$ is the final revenue function of MGi.

Compared with the prior art, the present invention has the following beneficial effects.

The present invention provides a quick-response voltage control method of distribution systems considering multiple participants comprising a multiple agent system (MAS) and shows that the MAS can realize the calculation of voltage sensitivity by distributed computing method. Each agent only needs to collect the measurement data of its control area and communicate with neighboring agents to calculate all the voltage sensitivity parameters in the system, thus reducing the communication of the control system and improving the reliability and real-time performance of the control system. Then, each participant of voltage control carries out a bidding game based on economic incentive mechanism and imperfect information game model, and provides auxiliary service of voltage control for DNs while realizing maximum benefit.

DETAILED DESCRIPTION OF THE PRESENT INVENTION

The present invention will be described in detail below with reference to the accompanying drawings.

The present invention provides a quick-response voltage control method of distribution system considering multiple participants, and mainly studies the distributed voltage control of distribution system with the participation of multiple MGs. MGs are motivated by incentives from the DSOs to provide voltage supports while maximizing their profits through the bidding, and provides auxiliary service of voltage control for DNs.

The present invention provides a quick-response voltage control method of distribution system comprising a multiple agent system (MAS), which collects the local information of the distribution system controlled by each agent and interacts with the local information collected by each agent, so that voltage-power sensitivity of the distribution system, used for providing the theoretical basis for voltage regulation, is calculated by distributed calculation. and multiple participants, which establish incentive mechanism by DSOs based on the bidding game with imperfect information, and independently decide their own strategies to obtain the voltage regulation subsidy from the DSOs, according to the calculated voltage-power sensitivities, thus provide voltage support for the distribution system in the process of pursuing benefit maximization, and reducing the installation of additional voltage supporting equipment in the distribution system, improving the utilization rate of clean energy and achieving better economic and social benefits.

Figure 1:
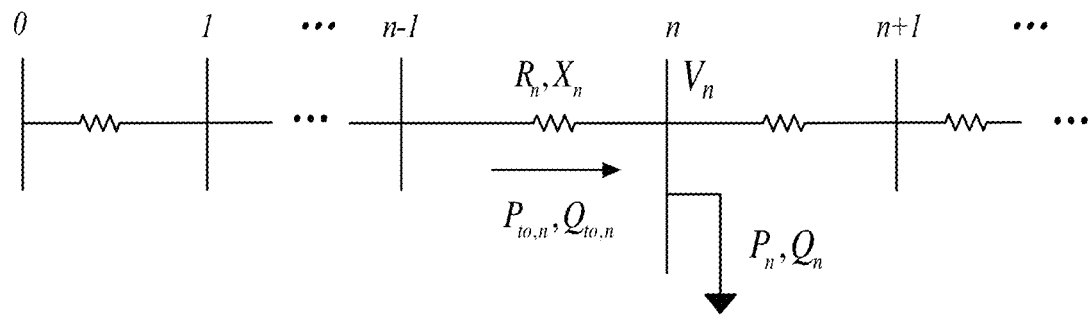
FIG. 1 is a diagram of a simplified distribution feeder.

Specifically, the quick-response voltage control method includes the following steps:

1) collect local information of the distribution system by each agent;

The local information described, as shown in FIG. 1, includes:

Voltage $V_n$ of Node n, injected active power $P_n$ and injected reactive power $Q_n$ of Node n, active power $P_{to,n}$ and reactive power $Q_{to,n}$ of Node n flow from the upstream branch, and the branch resistances $R_n$ and reactance $X_n$ between Node n−1 and Node n.

Figure 2A:
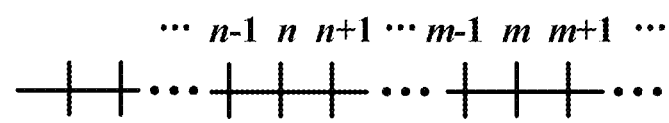
FIG. 2a is a topological diagram when Node m is downstream of Node n.

2) Calculate the voltage-power sensitivities of the radial DN by MAS, includes:

The voltage-power sensitivity between any two Nodes n and m in the radial DN is denoted by $$\frac{\partial V_m}{\partial P_n},$$

wherein $V_m$ denotes the voltage at Node m, $P_n$ denotes the injected active power of Node n. The calculation of $$\frac{\partial V_m}{\partial P_n}$$

is divided into the following three cases according to the relative topological positions of Nodes n and m.

a) When Node n is on the upstream of Node m, as shown in FIG. 2a, the calculation formula is as follows.

$$\frac{\partial V_m}{\partial P_n} = \frac{\partial V_n}{\partial P_n} \cdot \frac{\partial V_m}{\partial V_n} = \frac{\partial V_n}{\partial P_n} \cdot \prod_{i=n+1}^{m} \frac{\partial V_i}{\partial V_{i-1}} \quad (1)$$

Figure 2B:
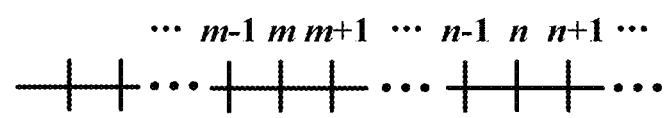
FIG. 2b is a topological diagram when Node m is upstream of Node n.

Wherein, $V_n$ denotes the voltage of Node n, $V_i$ denotes the voltage of Node i, $V_{n-1}$ denotes the voltage of Node n−1, $$\frac{\partial V_i}{\partial V_{i-1}}$$

denotes the influence degree of unit change of $V_{i-1}$ caused by the change of the injected power of Node i−1 and its upstream Node on $V_i$.

b) When Node m is in the upstream of Node n, as shown in FIG. 2b, the calculation formula is as follows.

$$\frac{\partial V_m}{\partial P_n} \approx \frac{\partial V_m}{\partial P_m} \cdot \frac{\partial P_{to,m}}{\partial P_{to,n}} = \frac{\partial V_m}{\partial P_m} \cdot \prod_{i=m+1}^{n} \frac{\partial P_{to,i-1}}{\partial P_{to,i}} \quad (2)$$

Figure 2C:
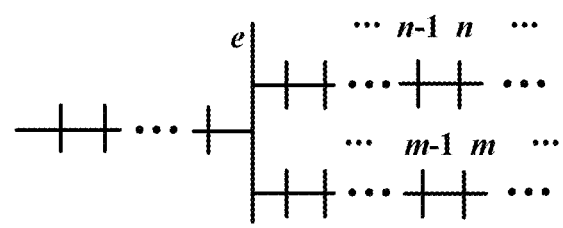
FIG. 2c is a topological diagram of Node m and Node n in different branches.

Wherein, $P_{to,n}$ denotes the active power flowing into Node n from the upstream branch, $P_{to,m}$ denotes the active power flowing into Node m from the upstream branch, $P_{to,i}$ denotes the active power flowing into Node i from the upstream branch, $P_{to,i-1}$ denotes the active power flowing into Node i−1 from the upstream branch, $$\frac{\partial P_{to,i-1}}{\partial P_{to,i}}$$

denotes the influence degree of unit power change of $P_{to,i}$ caused by Node n or its downstream Nodes on $P_{to,i-1}$.

c) Node m and Node n are on different branches, as shown in FIG. 2c, Node e is the common node of two branches of Node n and Node m, the calculation formula is as follows.

$$\frac{\partial V_m}{\partial P_n} = \left(\frac{\frac{\partial V_e}{\partial P_n}}{\frac{\partial V_e}{\partial P_e}}\right) \cdot \frac{\partial V_m}{\partial P_e} \quad (3)$$

Wherein, $V_e$ denotes the voltage of Node e, $P_e$ denotes the injected active power of node e, $$\frac{\partial V_m}{\partial P_e} \text{ and } \frac{\partial V_e}{\partial P_n}$$

are obtained by formula (1) and formula (2), respectively.

In the above three calculation cases, for any Node n, the calculation formula is as follows.

In the above three calculation cases, for any Node n, the calculation formulas are as follows.

$$\frac{\partial V_n}{\partial V_{n-1}} = \frac{V_n^2}{V_n^2 - (R_n P_{to,n} + X_n Q_{to,n})} \quad (4)$$

$$\begin{cases} \frac{\partial y_1}{\partial P_1} = -\frac{R_1}{y_1} \\ \frac{\partial y_n}{\partial P_n} = -\sum_{i=1}^{n}\left[\frac{R_i}{V_i} \cdot \left(\prod_{j=i+1}^{n} \frac{\partial P_{to,j-1}}{\partial P_{to,j}}\right) \cdot \frac{\partial P_{to,n}}{\partial P_n}\right] \approx -\sum_{i=1}^{n}\left(\frac{R_i}{V_i} \cdot \prod_{j=i+1}^{n} \frac{\partial P_{to,j-1}}{\partial P_{to,j}}\right), n > 1 \end{cases} \quad (5)$$

-continued $$\frac{\partial P_{to,n-1}}{\partial P_{to,n}} = \frac{V_n^3 + 2P_{to,n}R_nV_n - 2R_n(P_{to,n}^2 + Q_{to,n}^2) \cdot \frac{\partial V_n}{\partial P_n}}{V_n^3} \quad (6)$$

Wherein, $V_1$ denotes the voltage of Node 1, $R_1$ and $X_1$ denote the branch resistance and reactance between Node 0 and Node 1 respectively, and $P_1$ denotes the injected active power of Node 1. $P_{to,j}$ denotes the active power flowing into Node j from the upstream branch; $P_{to,j-1}$ denotes the active power flowing into Node j−1 from the upstream branch; $R_i$ and $X_1$ denote the branch resistance and reactance between Node i−1 and Node i respectively; $R_n$ and $X_n$ denote the branch resistance and reactance between Node n−1 and Node n respectively;

The derivations of $$\frac{\partial P_{to,n-1}}{\partial P_{to,n}} \text{ and } \frac{\partial V_n}{\partial P_n}$$

cannot be obtained directly and the iteration process is required. At the first iteration, the increment of line losses is negligible, i.e.

$$\frac{\partial P_{to,i}}{\partial P_{to,i+1}} \approx 1,$$

∀i=1, 2, . . . , n. Under the assumption, the approximation of $$\frac{\partial V_n}{\partial P_n}, \left(\frac{\partial V_n}{\partial P_n}\right)^*$$

can be expressed as follows:

$$\left(\frac{\partial V_n}{\partial P_n}\right)^* = -\sum_{i=1}^{n}\left(\frac{R_i}{V_i} \cdot \prod_{j=i+1}^{n}\frac{\partial P_{to,j-1}}{\partial P_{to,j}}\right) \approx -\sum_{i=1}^{n}\frac{R_i}{V_i} \quad (7)$$

The second iteration using the result of the first iteration, i.e., put formula (7) into formula (6), at this point, $$\frac{\partial P_{to,n-1}}{\partial P_{to,n}}$$

can be expressed as follows:

$$\frac{\partial P_{to,n-1}}{\partial P_{to,n}} = \frac{V_n^3 + 2P_{to,n}R_nV_n + 2R_n(P_{to,n}^2 + Q_{to,n}^2) \cdot \sum_{i=1}^{n}\frac{R_i}{V_i}}{V_n^3} \quad (8)$$

Then put formula (8) into formula (7) to obtain the voltage-power sensitivity $$\frac{\partial V_n}{\partial P_n}$$

with approximate accuracy.

3) Establish the incentive mechanism by the DSO, includes:

The reward $\pi_{DSO}$ given by the DSO is determined by the cost of voltage before and after the voltage control, the reward is defined as:

$$\pi_{DSO} = CV(V_{before}) - CV(V_{after}) \quad (9)$$

$$CV(V) = \frac{1}{n} \cdot \sum_{i=1}^{n}\left(\frac{1-V_n}{\Delta V_{err}}\right)^\alpha \quad (10)$$

Wherein, $V_{before}$ and $V_{after}$ denote voltage vectors before and after voltage regulation respectively; $V=\{V_i|i\in[1, n]\}$. $\Delta V_{err}$ is the maximum allowable voltage deviation; the adjustable variable α is fixed. The reward $\pi_{DSO}$ is only related to the voltage vector before and after voltage regulation, and is irrelevant to the numbers and strategies of MG agents. Therefore, the proposed method applies Shapley value to distribute the reward $\pi_{DSO}$. The profit function of MGi can be expressed as follows:

$$R_{MGi}(\Delta P_{MGi}) = \pi_{MGi}(\Delta P_{MGi}) - C_{MGi}(\Delta P_{MGi}) \quad (11)$$

Wherein, $\Delta P_{MGi}$ denotes the strategy of MGi in the voltage regulation process, i.e., the power regulation of MGi; $\pi_{MGi}(\Delta P_{MGi})$ and $C_{MGi}(\Delta P_{MGi})$ denote the reward and cost of MGi in the voltage regulation process, respectively.

Figure 3:
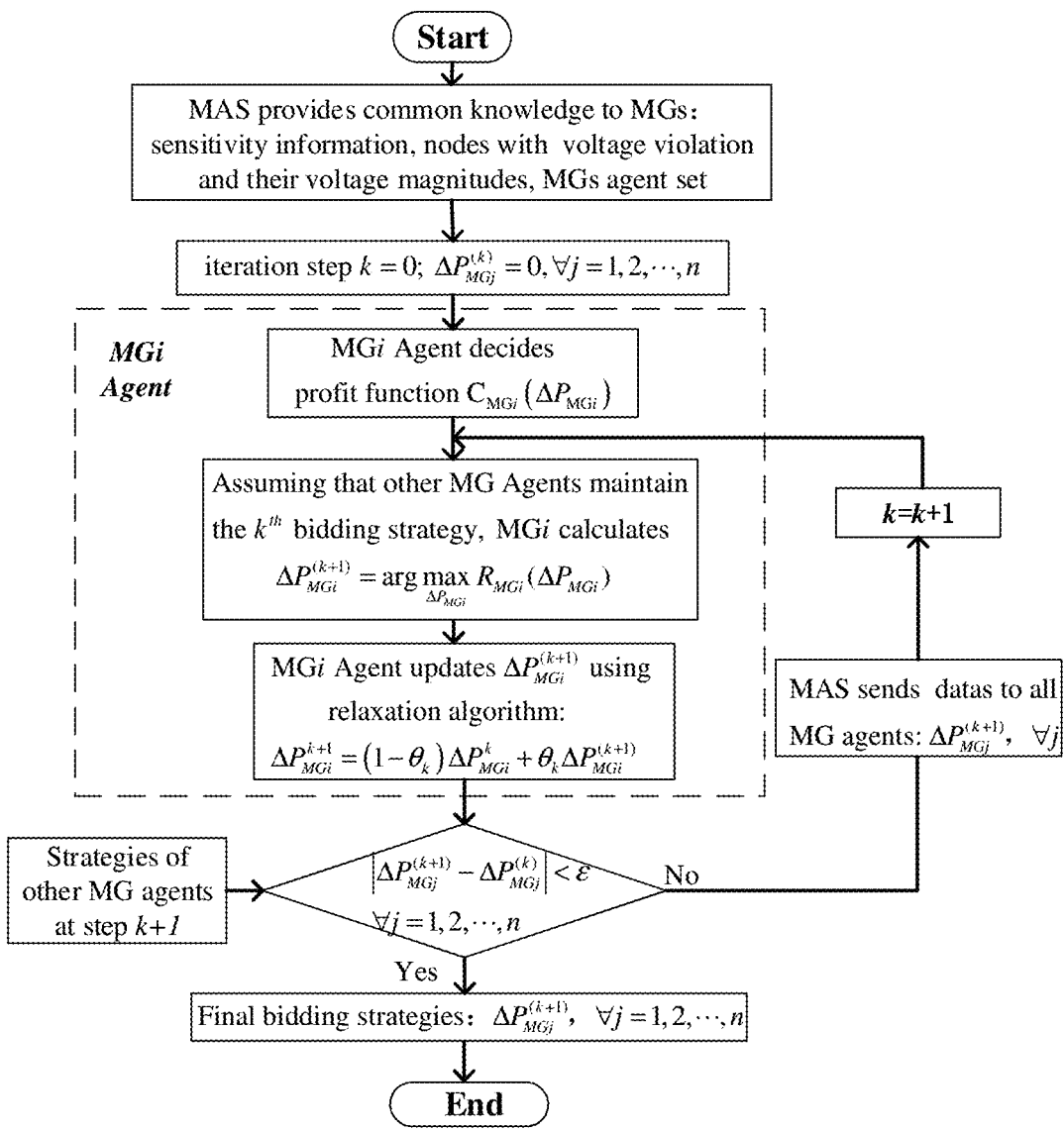
FIG. 3 is a flow chart of multi-agent bidding game.

4) Establish strategies by the participants (MGs) based on bidding games with imperfect information. As shown in FIG. 3, step 4) further includes:

For MGi, the flow chart of bidding game is shown in FIG. 3. When the system has a voltage excursion, the MAS obtains the voltage-power sensitivity required in the current-voltage regulation process, and sends the voltage-power sensitivity, the nodes with voltage violation and their voltage magnitudes to the MG Agents at all MGs participating in the current-voltage regulation. Then, all agents of the MG carry out game bidding: firstly, the i-th MG agent determines the current cost function, and according to the voltage-power sensitivity, the nodes with voltage violation and their voltage magnitudes to maximize its interests, the objective function is:

$$\text{Max}\{\pi_{MGi}(\Delta P_{MGi}) - C_{MGi}(\Delta P_{MGi})\} \quad (12)$$

Wherein, $\pi_{MGi}(\Delta P_{MGi})$ and $C_{MGi}(\Delta P_{MGi})$ denote the reward and cost of MGi in the voltage regulation process, respectively.

The MGi agent makes a decision $\Delta P_{MGi}$, and reports it to all agents of MG, then, according to the strategies of other MG agents, the MGi agent updates its own strategy using the relaxation algorithm and makes the decision and reports it to all agents of MG again. All the MG Agents repeat the process of game bidding of the i-th MG agent until all the MG agents no longer change their strategies. Therefore, the distribution system runs at the Nash equilibrium point $\Delta P_{MG}^* = (\Delta P_{MG1}^*, \Delta P_{MG2}^*, \ldots, \Delta P_{MGn}^*)$ of this game bidding, for MGi, the calculation formulas are as follows.

$$\Delta P_{MGi}^* = \arg\max_{\Delta P_{MGi}} R_{MGi}(\Delta P_{MG1}^*, \Delta P_{MG2}^*, \ldots, \Delta P_{MGi}, \ldots, \Delta P_{MGn}^*) \quad (13)$$

Wherein, $R_{MGi}(\Delta P_{MG1}^*, \Delta P_{MG2}^*, \ldots, \Delta P_{MGi}, \ldots, \Delta P_{MGn}^*)$ is the final revenue function of the MGi.

Specific examples will be described below with reference to the accompanying drawings.

Figure 4:
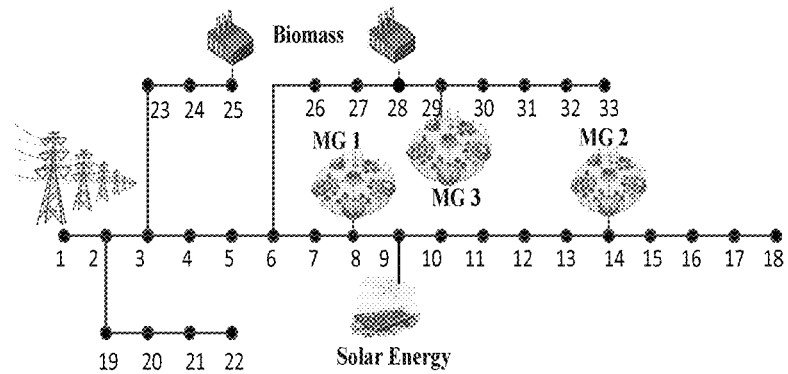
FIG. 4 is a topological diagram of a modified IEEE33 network.
Figure 5:
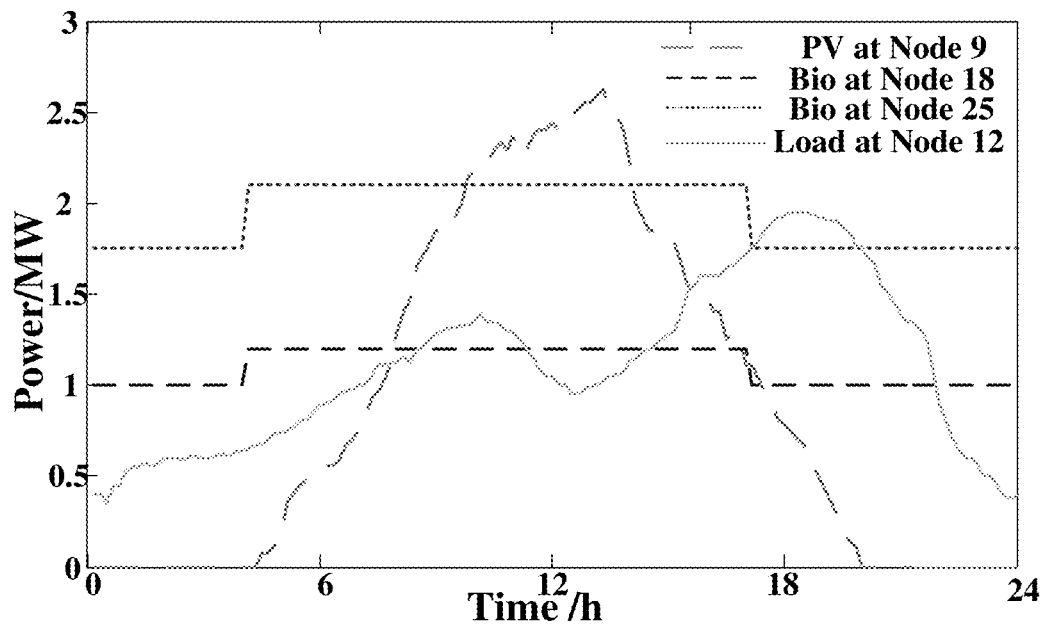
FIG. 5 is a daily power profile of DG units and load.
Figure 6:
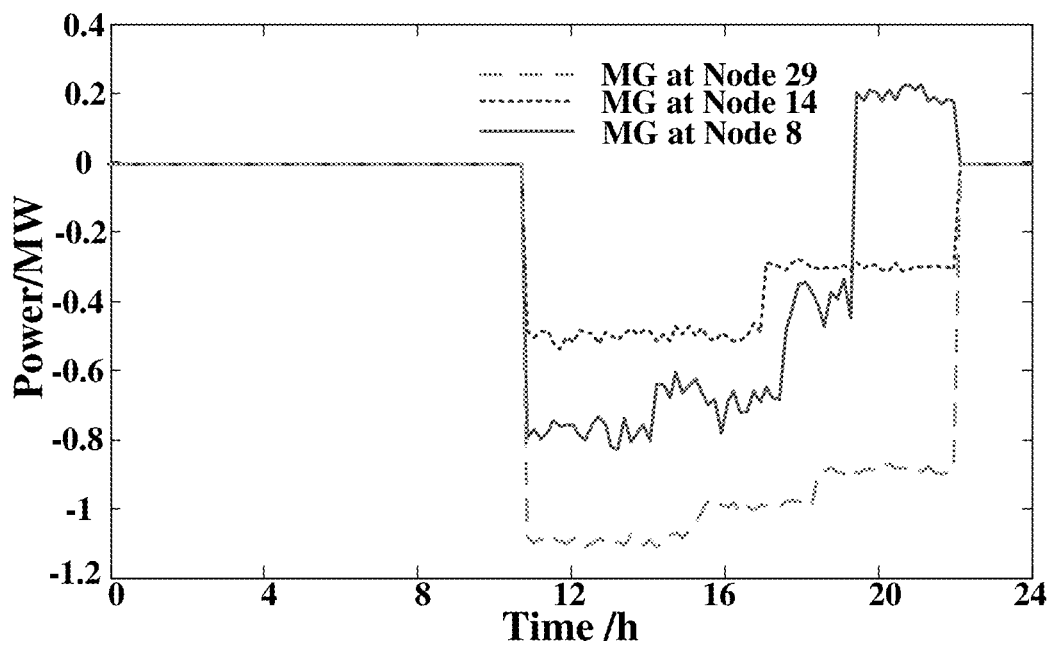
FIG. 6 is the daily power profiles of interconnection line of three participants (MGs)

The present invention verifies the proposed voltage control method by using the adjusted IEEE33 node DN, the topology of networks is shown in FIG. 4, wherein, the type, installation position and capacity of DG units are shown in Table 2. All the loads are fixed except the load at Node 12. The daily power variation of DG units and load at Node 12 is shown in FIG. 5. Furthermore, there are three MGs participating in voltage control, and the three MGs are connected to Node 8, 14 and 29, respectively. Before the MAS system participates in the regulation, the PCC daily power profiles of three participants (MGs) are shown in FIG. 6. The negative power of PCC means that MG injects power into the grid and vice versa. In the case studies, the voltage constraint is predefined as [0.95, 1.05] and thereby $\Delta V_{err} = 0.05$. In addition, in order to simplify the analysis, the weighting term in the relaxation algorithm is fixed at 0.5.

Figure 7:
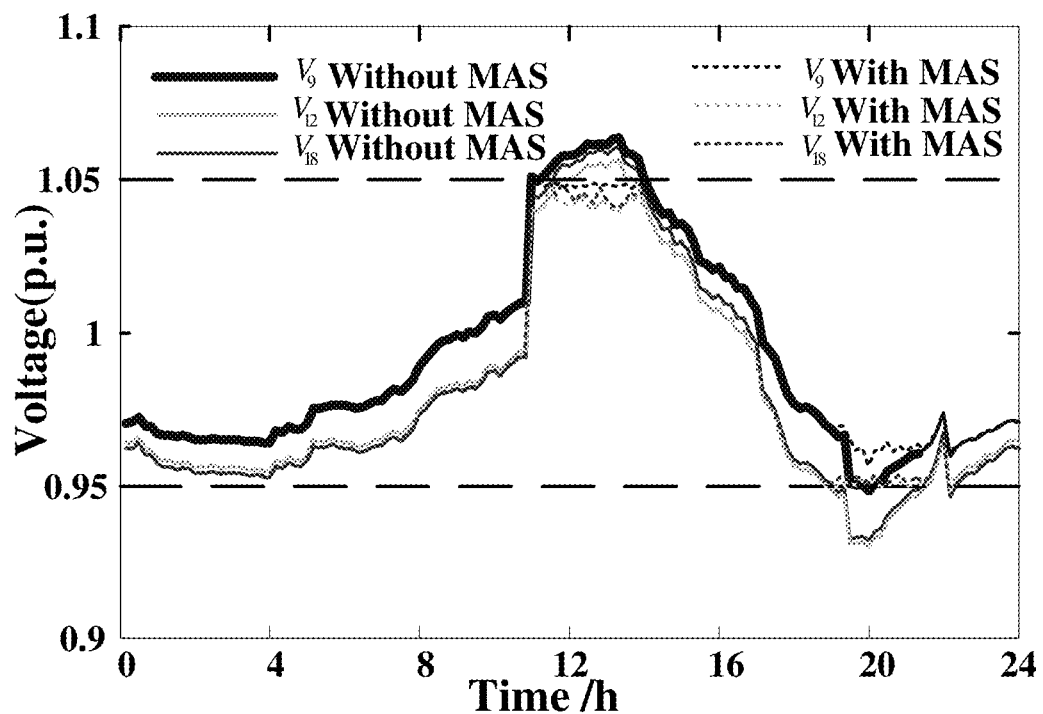
FIG. 7 is the voltage profiles of three representational Nodes (9, 12 and 18) with and without control.

When the MAS system is not involved in the control, the photovoltaic output power at Node 9 is large due to sufficient sunshine during the period from 11:00 to 14:00, and the voltage is out of the limits; From 19:00 to 21:00, the load 12 increased and the MG at Node 8 absorbed power from the grid, and the voltage exceeded the lower limit. After the MAS system participates in the control, all node voltages can be effectively controlled within a reasonable range. Node 9, Node 12 and Node 18, which have a large voltage violation degree before the MAS participates in control, are selected to reflect the voltage control effect of the MAS. The voltage profiles before and after the MAS participating in control are shown in FIG. 7.

Taking the scenario t=19:40 as an example, the overall control process is explained in details. When t=19:40, the MAS monitors voltage levels exceeding the lower limit with the worst case at Node 12 $V_{12}=0.931$, and then each agent in the MAS starts to measure local data and communicate with adjacent agents to calculate necessary sensitivities for voltage control:

$$\frac{\partial V_{12}}{\partial P_8} = -0.0206, \frac{\partial V_{12}}{\partial P_{14}} = -0.0387 \text{ and } \frac{\partial V_{12}}{\partial P_{29}} = -0.0140.$$

Then, the MAS sends the sensitivities and α=14 defined by the DSO as common knowledge to MG agents: MG1 Agent at Node 8, MG2 Agent at Node14, MG3 Agent at Node 29. The MG agents can inject more power into grid to eliminate voltage violation by increasing the generation output, demand shaving and storage discharging. Either way, there will be a certain cost. MG Agents need to determine $C_{MG}(\Delta P_{MG})$ according to their operation conditions to maximize their interests. For convenience, $C_{MG}(\Delta P_{MG})$ in this case is in the form of a linear function. When t=19:40, there are:

$$C_{MG1}(\Delta P_{MG1}) = C_1 \Delta P_{MG1}$$
$$C_{MG2}(\Delta P_{MG2}) = C_2 \Delta P_{MG2}$$
$$C_{MG3}(\Delta P_{MG3}) = C_3 \Delta P_{MG3}$$

Figure 8:
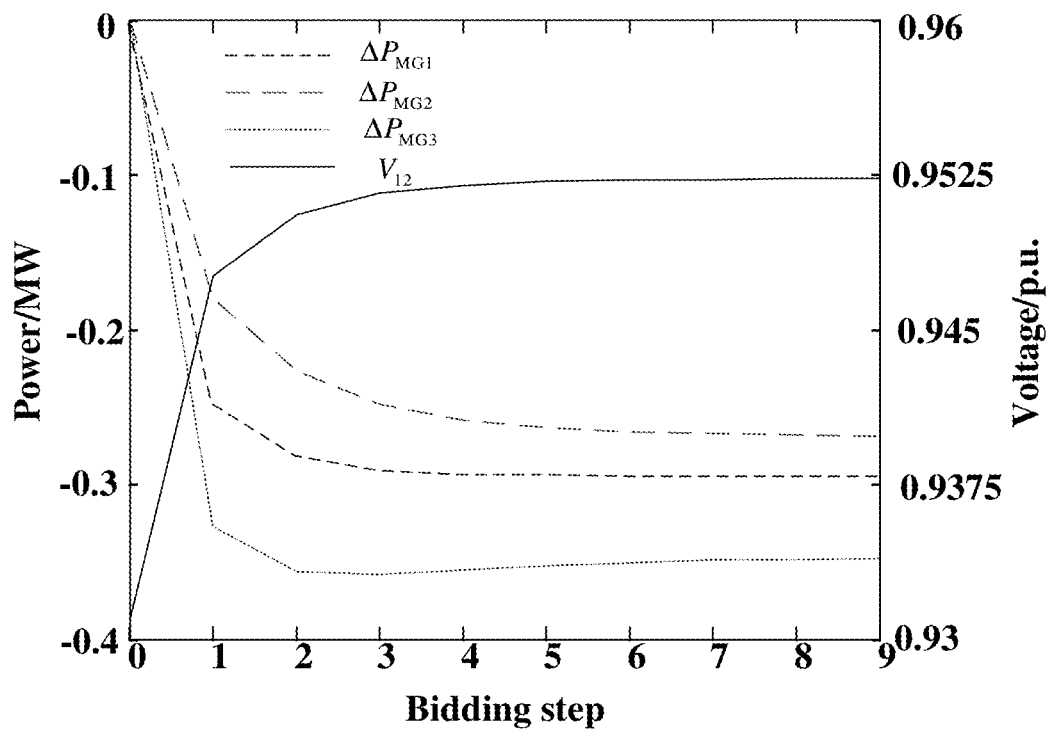
FIG. 8 is the bidding profiles and voltage profiles of V12 at time 19:40.
Figure 9:
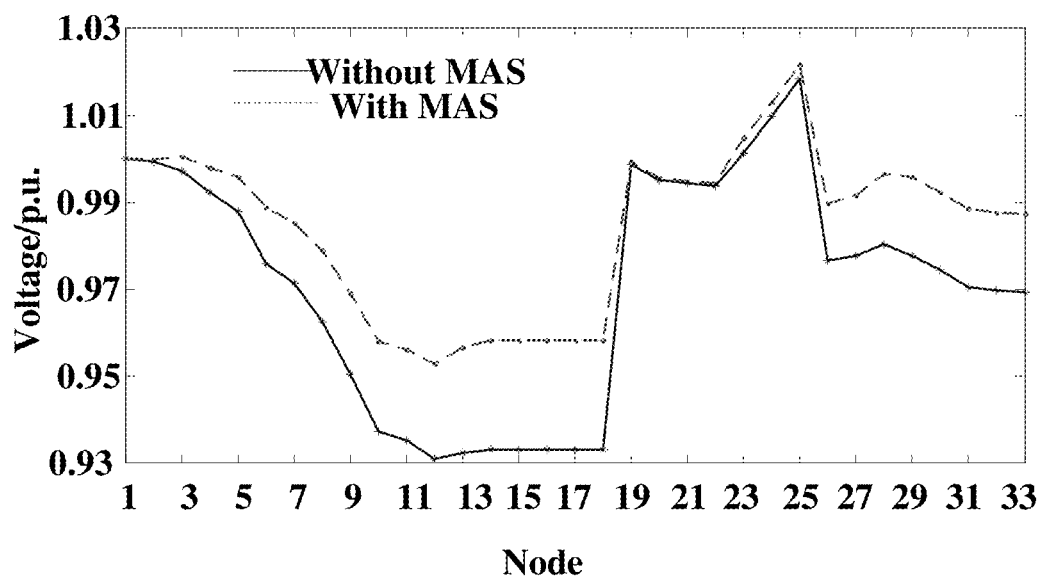
FIG. 9 is the voltage profiles of 33 Nodes before and after MAS control at time 19:40.

Wherein, $C_1 = 48$ \$/MW, $C_2 = 38$\$/MW, $C_3 = 40$ \$/MW. According to formula (18), MG Agents make their benefit maximization of $\Delta P_{MGi}^1$, and as a strategy to participate in the first round of the bidding game. Then, MG Agent updates its strategy according to the strategies of other MG agents until all the MG agents cannot change their strategies. In the control process at t=19:40, after 0.98 s, the three MG Agents did not change their strategies after 9 bids, the strategies converge to a Nash equilibrium: $\Delta P_{MG1} = -0.292$ MW, $\Delta P_{MG2} = -0.268$ MW, $\Delta P_{MG3} = -0.348$ MW. The bidding profiles and corresponding $V_{12}$ of three MG Agents are shown in FIG. 8. The voltage profiles of 33 Nodes before and after MAS takes part in the control are shown in FIG. 9.

The foregoing description is just a preferred embodiment of the present invention and is not intended to limit the present invention. Any modifications, equivalent replacements and improvements made within the spirit and principle of the present invention shall be included within the protection scope of the present invention.

REFERENCES

[1] Fan Mingtian, Zhang Zuping, Su Aoxue, et al. Enabling technologies for active distribution systems [J]. Proceedings of the CSEE, 2013, 36(22): 12-18.
[2] Zhong Qing, Sun Wen, Yu Nanhua, et al. Load and power forecasting in active distribution network planning [J]. Proceedings of the CSEE, 2014, 34(19): 3050-3056.
[3] Xu Tao, Wade Neal, Davidson Euan, et al. Case-Based reasoning for coordinated voltage control on distribution networks[J]. Electric Power Systems Research, 2011, 81(12):2088-2098.
[4] Liu Dong, Chen Yunhui, et al. Hierarchical energy management and coordination control of active distribution network [J]. Proceedings of the CSEE, 2014, 34(31): 5500-5506
[5] Borghetti A, Bosetti M, Grillo S, et al. Short-term scheduling and control of active distribution systems with high penetration of renewable resources [J]. IEEE Systems Journal. 4(3): 313-322.
[6] Florin C, Ilya B, and Esther R R. A comprehensive centralized approach for voltage constraints management in active distribution[J]. IEEE Transactions on power systems, 2014, 29(2):933-942.
[7] Georgios C K, Charis S D, and Grigoris K P. A nearly decentralized voltage regulation algorithm for loss minimization in radial MV networks with high DG penetration [J]. IEEE Transactions on Sustainable Energy, 2016, 7(4):1430-1439.
[8] Chengshan Wang, Zhen Wu, and Peng Li. Research on Key Technologies of Microgrid[J]. Transactions of china electrotechnical society, 2014, 29(2): 1-12.
[9] Lv Tianguang, Ai Qian, Sun Shumin, et al. Behavioural analysis and optimal operation of active distribution system withmulti-microgrids[J]. Proceedings of the CSEE, 2016, 36(1):122-132 (in Chinese).
[10] Zhaoyu Wang, Bokan C, Jianhui W, et al. Coordinated energy management of networks microgrids in distribution systems [J]. IEEE Transactions on Smart Grid, 2015, 6(1): 45-53.
[11] Ni Zhang, Yu Yan, Wencong Su. A game-theoretic economic operation of residential distribution system with high participation of distributed electricity prosumer [J]. Applied energy, 154(2015): 471-479.

What is claimed is:

1. A method of controlling voltages of power distribution networks (DNs) considering multiple agents, comprising:

a multiple agent system (MAS), which collects local information of the power distribution networks controlled by each agent of the multiple agents and interacts with the local information collected by each agent, so that voltage-power sensitivity of the power distribution networks, used for providing the theoretical basis for voltage regulation, is calculated by distributed calculation, wherein the local information comprises Voltage $V_n$ of Node n, injected active power $P_n$ and injected reactive power $Q_n$ of Node n, active power $P_{to,n}$ and reactive power $Q_{to,n}$ of Node n flow from the upstream branch, and the branch resistances $R_n$ and reactance $X_n$ between Node n−1 and Node n; and the multiple agents, which establish incentive mechanism by distribution system operators (DSOs) based on bidding game with imperfect information, and independently decide their own strategies to obtain the voltage regulation subsidy from the DSOs, according to the calculated voltage-power sensitivities, thus providing voltage support for the power distribution networks in the process of pursuing benefit maximization;

wherein the multiple agents comprise microgrids (MGs) and each of the MGs comprising distributed generation (DG) units, loads, energy storage systems, and monitoring systems;

the method of controlling voltages of DNs comprises the following steps:

1) Collecting local information of the power distribution networks by each agent;
2) calculating the voltage-power sensitivities of the radial DN by MAS;
3) establish the incentive mechanism by the DSO;
4) establish strategies by the MGs based on bidding games with imperfect information;

wherein the Step 4) includes:

for MGi, when a voltage excursion occurs, the MAS obtains the voltage-power sensitivity required in the current-voltage regulation process, and sends the voltage-power sensitivity, the nodes with voltage violation and their voltage magnitudes to the MG Agents at all MGs participating in the current-voltage regulation; then, all agents of the MG carry out game bidding: firstly, the i-th MG agent determines the current cost function, and according to the voltage-power sensitivity, the nodes with voltage violation and their voltage magnitudes to maximize its interests, the objective function is:

$$\text{Max}\{\pi_{MGi}(\Delta P_{MGi}) - C_{MGi}(\Delta P_{MGi})\} \quad (12)$$

wherein $\pi_{MGi}(\Delta P_{MGi})$ and $C_{MGi}(\Delta P_{MGi})$ denote the reward and cost of MGi in the voltage regulation process respectively;

the MGi agent makes a decision $\Delta P_{MGi}$ and reports it to all agents of MG; then according to the strategies of other MG agents, the MGi agent updates its own strategy using the relaxation algorithm and makes the decision and reports it to all agents of MG again; all the MG Agents repeat the process of game bidding of the i-th MG agent until all the MG agents no longer change their strategies; therefore, the power distribution networks run at the Nash equilibrium point $\Delta P^*_{MG} = (\Delta P^*_{MG1}, \Delta P^*_{MG2}, \ldots, \Delta P^*_{MGn})$ of this game bidding, for MGi, the calculation formulas are as follows:

$$\Delta P^*_{MGi} = \arg\max_{\Delta P_{MGi}} R_{MGi}(\Delta P^*_{MG1}, \Delta P^*_{MG2}, \ldots, \Delta P_{MGi}, \ldots, \Delta P^*_{MGn}) \quad (13)$$

wherein $R_{MGi}$ ($\Delta P^*_{MG1}$, $\Delta P^*_{MG2}$, . . . , $\Delta P_{MGi}$, . . . , $\Delta P^*_{MGn}$) is the final revenue function of the i-th MG.

2. The method of controlling voltages of DNs considering multiple agents according to claim 1, wherein the voltage-power sensitivities of the radial DN by MAS described in Step 2 is the voltage-power sensitivity between any two Nodes n and m in the radial DN, which is denoted by $$\frac{\partial V_m}{\partial P_n},$$

wherein $V_m$ denotes the voltage at Node m, $P_n$ denotes the injected active power of Node n; the calculation method of the voltage-power sensitivity $$\frac{\partial V_m}{\partial P_n}$$

is divided into the following three cases according to the relative topological positions of Nodes n and m:

a) when Node n is on the upstream of Node m, the calculation formula is as follows:

$$\frac{\partial V_m}{\partial P_n} = \frac{\partial V_n}{\partial P_n} \cdot \frac{\partial V_m}{\partial V_n} = \frac{\partial V_n}{\partial P_n} \cdot \prod_{i=n+1}^{m} \frac{\partial V_i}{\partial V_{i-1}} \quad (1)$$

wherein, $V_n$ denotes the voltage of Node n, $V_i$ denotes the voltage of Node i, $V_{n-1}$ denotes the voltage of Node n−1, $$\frac{\partial V_i}{\partial V_{i-1}}$$

denotes the influence degree of unit change of $V_{i-1}$ caused by the change of the injected power of Node i−1 and its upstream Node on $V_i$;

b) When Node m is in the upstream of Node n, the calculation formula is as follows:

$$\frac{\partial V_m}{\partial P_n} \approx \frac{\partial V_m}{\partial P_m} \cdot \frac{\partial P_{to,m}}{\partial P_{to,n}} = \frac{\partial V_m}{\partial P_m} \cdot \prod_{i=m+1}^{n} \frac{\partial P_{to,i-1}}{\partial P_{to,i}} \quad (2)$$

wherein $P_{to,n}$ denotes the active power flowing into Node n from the upstream branch, $P_{to,m}$ denotes the active power flowing into Node m from the upstream branch, $P_{to,i}$ denotes the active power flowing into Node i from the upstream branch, $P_{to,i-1}$ denotes the active power flowing into Node i−1 from the upstream branch, $$\frac{\partial P_{to,i-1}}{\partial P_{to,i}}$$

denotes the influence degree of unit power change of $P_{to,i}$ caused by Node n or its downstream Nodes on $P_{to,i-1}$;

c) Node n and Node m are on different branches, Node e is the common node of two branches of Node n and Node m, the calculation formula is as follows:

$$\frac{\partial V_m}{\partial P_n} = \left(\frac{\partial V_e}{\partial P_n} \Big/ \frac{\partial V_e}{\partial P_e}\right) \cdot \frac{\partial V_m}{\partial P_e} \quad (3)$$

wherein, $V_e$ denotes the voltage of Node e, $P_e$ denotes the injected active power of node e, $$\frac{\partial V_m}{\partial P_e} \text{ and } \frac{\partial V_e}{\partial P_n}$$

are obtained by formula (1) and formula (2), respectively;

in the above three calculation cases, for any Node n, the calculation formulas are as follows:

$$\frac{\partial V_n}{\partial V_{n-1}} = \frac{V_n^2}{V_n^2 - (R_n P_{to,n} + X_n Q_{to,n})} \quad (4)$$

$$\begin{cases} \frac{\partial V_n}{\partial P_1} = -\frac{R_1}{V_1} \\ \frac{\partial V_n}{\partial P_n} = -\sum_{i=1}^{n}\left[\frac{R_i}{V_i} \cdot \left(\prod_{j=i+1}^{n} \frac{\partial P_{to,j-1}}{\partial P_{to,j}}\right) \cdot \frac{\partial P_{to,n}}{\partial P_n}\right] \approx \\ \quad -\sum_{i=1}^{n}\left(\frac{R_i}{V_i} \cdot \prod_{j=i+1}^{n} \frac{\partial P_{to,j-1}}{\partial P_{to,j}}\right), n > 1 \end{cases} \quad (5)$$

$$\frac{\partial P_{to,n-1}}{\partial P_{to,n}} = \frac{V_n^3 + 2P_{to,n}R_n V_n - 2R_n(P_{to,n}^2 + Q_{to,n}^2) \cdot \frac{\partial V_n}{\partial P_n}}{V_n^3} \quad (6)$$

wherein, $V_1$ denotes the voltage of Node 1, $R_1$ and $X_1$ denote the branch resistance and reactance between Node 0 and Node 1 respectively, and $P_1$ denotes the injected active power of Node 1; $P_{to,j}$ denotes the active power flowing into Node j from the upstream branch; $P_{to,j-1}$ denotes the active power flowing into Node j−1 from the upstream branch; $R_i$ and $X_1$ denote the branch resistance and reactance between Node i−1 and Node i respectively; $R_n$ and $X_n$ denote the branch resistance and reactance between Node n−1 and Node n respectively;

the derivations of $$\frac{\partial P_{to,n-1}}{\partial P_{to,n}} \text{ and } \frac{\partial V_n}{\partial P_n}$$

cannot be obtained directly and the iteration process is required; at the first iteration, the increment of line losses is negligible, i.e.

$$\frac{\partial P_{to,i}}{\partial P_{to,i+1}} \approx 1,$$

$\forall i=1, 2, \ldots, n$; under the assumption, the approximation of $$\frac{\partial V_n}{\partial P_n} \cdot \left(\frac{\partial V_n}{\partial P_n}\right)^*$$

can be expressed as follows:

$$\left(\frac{\partial V_n}{\partial P_n}\right)^* = -\sum_{i=1}^{n}\left(\frac{R_i}{V_i} \cdot \prod_{j=i+1}^{n} \frac{\partial P_{to,j-1}}{\partial P_{to,j}}\right) \approx -\sum_{i=1}^{n} \frac{R_i}{V_i} \quad (7)$$

the second iteration using the result of the first iteration, i.e., put formula (7) into formula (6), at this point, $$\frac{\partial P_{to,n-1}}{\partial P_{to,n}}$$

can be expressed as follows:

$$\frac{\partial P_{to,n-1}}{\partial P_{to,n}} = \frac{V_n^3 + 2P_{to,n}R_n V_n - 2R_n(P_{to,n}^2 + Q_{to,n}^2) \cdot \sum_{i=1}^{n}\frac{R_i}{V_i}}{V_n^3} \quad (8)$$

then put formula (8) into formula (7) to obtain the voltage-power sensitivity $$\frac{\partial V_n}{\partial P_n}$$

with approximate accuracy.

3. The method of controlling voltages of DNs considering multiple agents claimed according to claim 1, wherein Step 3) includes:

the reward $\pi_{DSO}$ given by the DSO is determined by the cost of voltage before and after the voltage control, which the calculation formula is as follows:

$$\pi_{DSO} = CV(V_{before}) - CV(V_{after}) \quad (9)$$

$$CV(V) = \frac{1}{n} \cdot \sum_{i=1}^{n}\left(\frac{1-V_n}{\Delta V_{err}}\right)^\alpha \quad (10)$$

wherein, $V_{before}$ and $V_{after}$ denote voltage vectors before and after voltage regulation respectively; $V=\{V_i | i \in [1, n]\}$; $\Delta V_{err}$ is the maximum allowable voltage deviation; the adjustable variable $\alpha$ is even number; the reward $\pi_{DSO}$ is only related to the voltage vector before and after voltage regulation, and is irrelevant to the numbers and strategies of MG agents; therefore, the proposed method applies Shapley value to distribute the reward $\pi_{DSO}$; the profit function of MGi can be formulated as:

$$R_{MGi}(\Delta P_{MGi}) = \pi_{MGi}(\Delta P_{MGi}) - C_{MGi}(\Delta P_{MGi}) \quad (11)$$

wherein $\Delta P_{MGi}$ denotes the strategy of MGi in the voltage regulation process, i.e., the power regulation of MGi; $\pi_{MGi}(\Delta P_{MGi})$ and $C_{MGi}(\Delta P_{MGi})$ denote the reward and cost of MGi in the voltage regulation process respectively.

* * * * *